United States Patent
Rice

(10) Patent No.: US 6,739,562 B2
(45) Date of Patent: May 25, 2004

(54) BRACKET FOR BRIDGING MEMBER FOR METAL STUD WALL

(76) Inventor: John Rice, c/o 1 Caldari Road, Concord, Ontario (CA), L4K 3Z9

(*) Notice: Subject to any disclaimer, the term of this patent is extended or adjusted under 35 U.S.C. 154(b) by 0 days.

(21) Appl. No.: 09/822,856

(22) Filed: Apr. 2, 2001

(65) Prior Publication Data

US 2002/0046525 A1 Apr. 25, 2002

(30) Foreign Application Priority Data

Mar. 31, 2000 (CA) ............................................. 2304264

(51) Int. Cl.[7] ............................................. A47G 29/02
(52) U.S. Cl. ........................ 248/247; 248/300; 52/669; 403/188; 403/194
(58) Field of Search ................................. 211/192, 191; 248/247, 448, 300, 220.31; 52/667, 669, 489.1; 403/187, 188, 192, 195, 194; 256/65

(56) References Cited

U.S. PATENT DOCUMENTS

| | | | | |
|---|---|---|---|---|
| 529,154 A | * | 11/1894 | Banks | |
| 2,905,426 A | * | 9/1959 | Ross | |
| 3,299,839 A | * | 1/1967 | Nordbak | |
| 3,322,447 A | * | 5/1967 | Biggs | |
| 3,490,604 A | * | 1/1970 | Klein | |
| 3,606,227 A | * | 9/1971 | Klein | |
| 3,858,988 A | * | 1/1975 | Cohen | |
| 4,406,374 A | * | 9/1983 | Yedor | |
| 4,428,172 A | * | 1/1984 | Larsson | |
| 5,784,850 A | * | 7/1998 | Elderson | |
| 5,921,411 A | * | 7/1999 | Merl | |
| 5,964,071 A | * | 10/1999 | Sato | |
| 6,199,336 B1 | * | 3/2001 | Poliquin | |

* cited by examiner

Primary Examiner—Korie Chan

(57) ABSTRACT

The present invention provides in one aspect for a bracket for use in a metal stud wall having internal bridging members for tying the metal studs and bridging members together. The bracket has an L shaped central region having a leg for overlying the bridging member and an upright for overlying the metal stud. A web gripping means is provided connected to the upright for gripping the web of the stud and transferring the support of the upright to the web. The bracket also has a bridging member gripping means connected to the leg for gripping the bridging member and transferring the support of the gripping member to the L shaped central region.

10 Claims, 6 Drawing Sheets

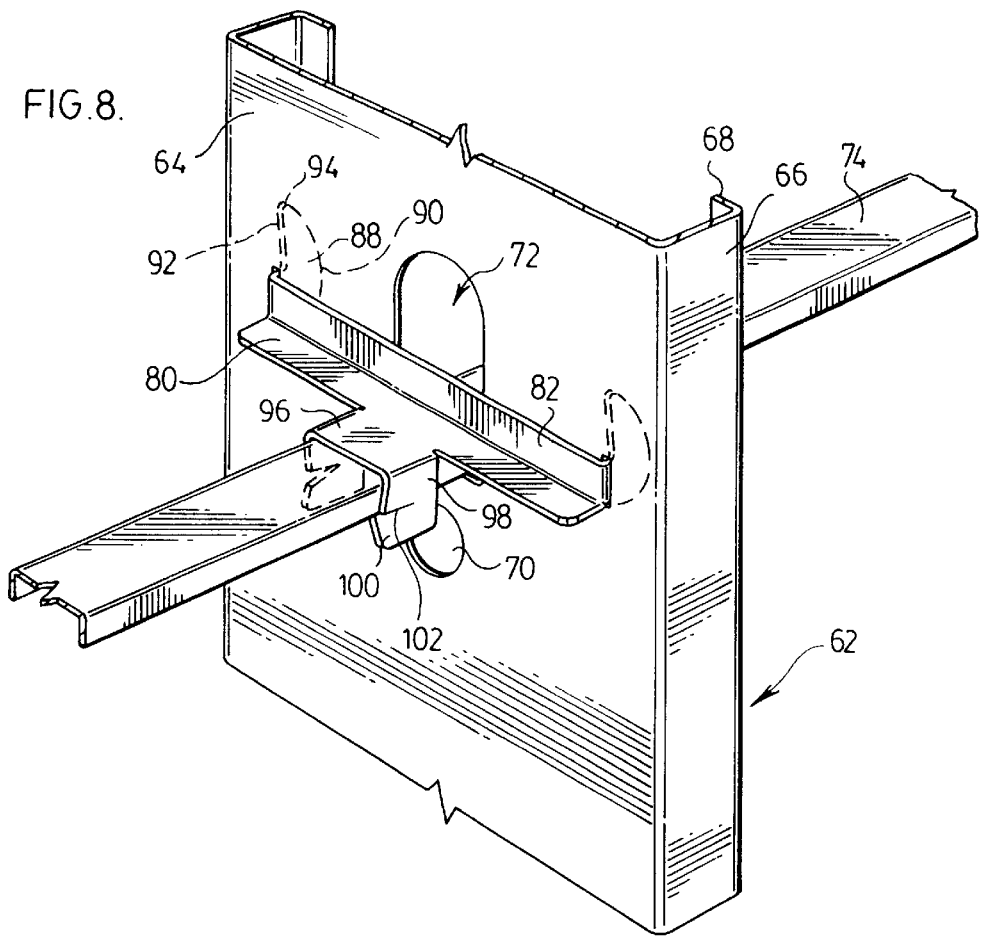
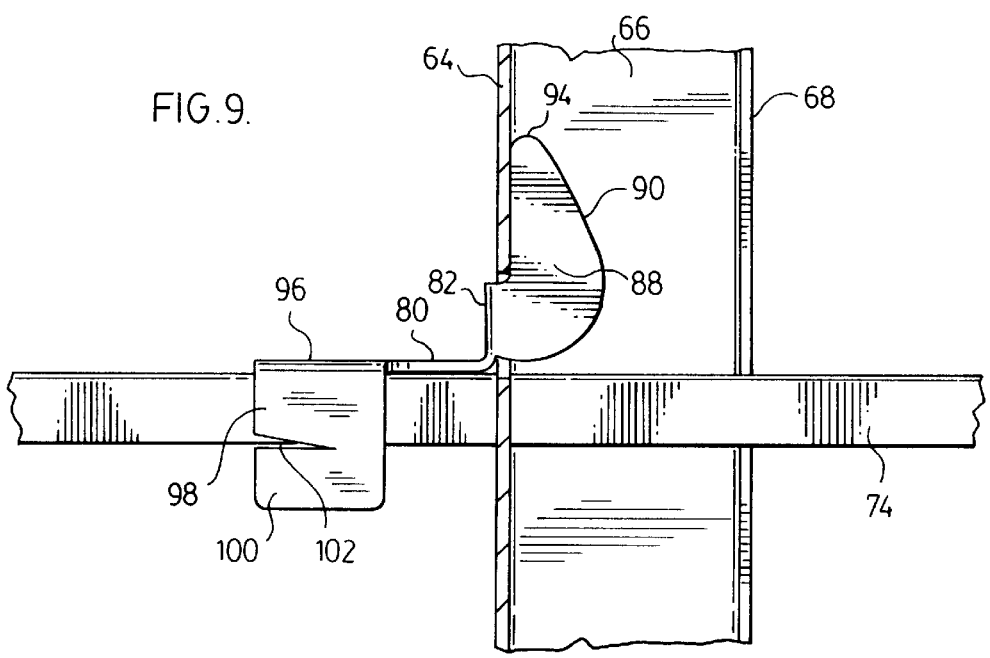

BRACKET FOR BRIDGING MEMBER FOR METAL STUD WALL

FIELD OF THE INVENTION

The present invention relates to a bracket for attaching bridging to the studs of a metal stud wall. In particular, the invention relates to a bracket which is simple

BACKGROUND OF THE INVENTION

Metal studs for use in constructing partion walls are becoming more prevalent. The metal studs have a manner similar to wood studs for constructing partition walls. The metal studs are typically tied together at the top and bottom by U-shaped channel members which act as top and bottom plate for the stud wall. Stud walls which are subjected to wind and/or axial loads, such as is found if the stud wall forms the exterior wall or is a load bearing wall, require lateral support to provide resistance to rotation and minor axis bending under wind and axial loads.

Support for metal stud walls is generally provided by installing bridging members which tie the metal studs together at points intermediate their ends. These bridging members may be either metal strapping screwed to the outside flanges of the studs or may be internal bridging members installed through openings provided in the web of the metal stud. In order to transfer the support provided by the internal bridging members to the metal studs, the bridging members must be physically tied in some manner to the metal stud. In some circumstances this physical tying of the internal bridging member to the metal stud may be provided by merely welding the edge of the bridging member to the metal stud. In other installations it is necessary to transfer the support provided by the bridging members to the edges of the metal studs. In these circumstances L-shaped brackets are generally provided with the leg of the L shaped bracket being mechanically fastened to the internal bridging member and the upright of the L-shaped bracket mechanically fastened to the metal stud. The mechanical fastenings may be provided either by screws or by welding. The installation of the brackets for tying the metal studs and bridging members together can be labor-intensive requiring the installer to install up to four screws for every bracket or to provide for three or four welds for each bracket. In a typical wall where the studs are spaced 16 inches on center and are provided with two or three such bridging members arranged at different heights. This can require a large number of brackets and fastening applications adding up to very significant labor costs. There is a risk that the installer may try to save time by not providing all of the fastening required such as not utilizing enough screws or by not installing all of the brackets. In either of these circumstances, the structural integrity of the stud wall may be compromised.

There thus remains a need for a simple to install bracket for bridging members and metal studs which will ensure that all required support is provided and will also result in significant labor savings.

SUMMARY THE INVENTION

The present invention provides in one aspect for a novel bracket for use in a metal stud wall having internal bridging members for tying the metal studs and bridging members together. The bracket comprises an L shaped central region having a leg for overlying the bridging member and an upright for overlying the metal stud. A web gripping means is provided connected to the upright for gripping the web of the stud and transferring the support of the upright to the web. The bracket also has a bridging member gripping means connected to the leg for gripping the bridging member and transferring the support of the gripping member to the L shaped central region.

In another aspect of the invention, there is provided a metal stud partition wall, the wall comprising a plurality of spaced apart vertical metal studs joined at the top and bottom by U shaped channel members in which the ends of the studs are connected. The wall is also provided with at least one internal bridging member, the internal bridging member passing through openings provided in the web of the metal studs. The bridging member or members are structurally tied to the metal studs by brackets without the use of screws or welding. The brackets comprise an L shaped central region having a leg overlying the bridging member and an upright overlying the web of the metal stud. The bracket includes web gripping means connected to the upright gripping the web of the stud and transferring the support of the upright to the web. The bracket also includes a bridging member gripping means connected to the leg gripping the bridging member and transferring the support of the gripping member to the L shaped central region.

BRIEF DESCRIPTION OF THE DRAWINGS

Preferred embodiments of the bracket of the present invention are illustrated in the attached drawings in which:

FIG. 8 is a perspective view of the bracket of FIG. 7 attached to the stud and bridging member; and FIG. 9 is a side elevation view of the bracket of FIG. 7 attached to the stud and bridging member.

DETAILED DESCRIPTION OF THE PREFERRED EMBODIMENTS

Figure 1:
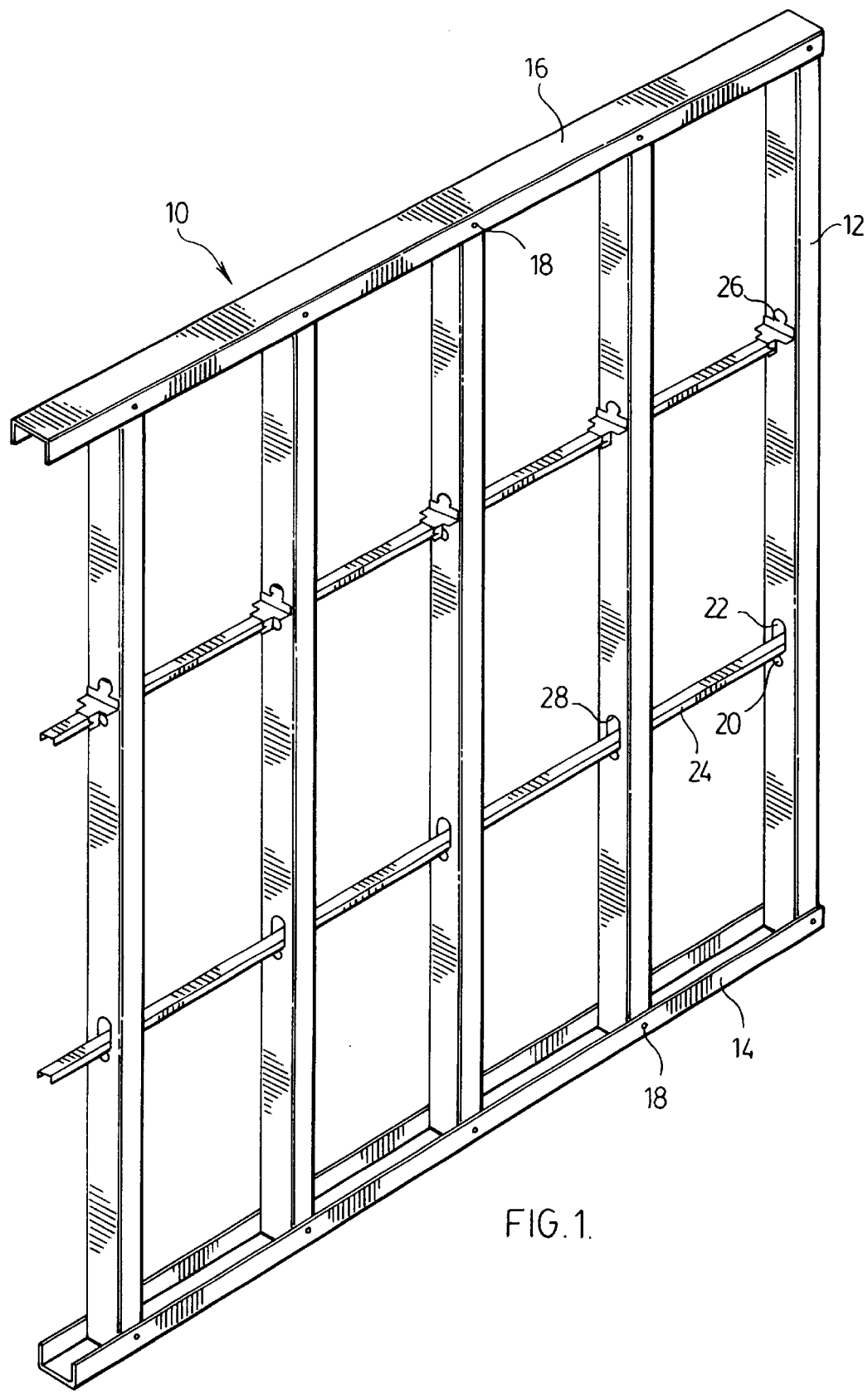
FIG. 1 is a perspective view of a typical metal stud wall.

FIG. 1 illustrates a typical metal stud wall generally indicated by the number 10. Stud wall 10 is constructed of a series of metal studs 12 held in position by a bottom track 14 and a top track 16. Metal studs 12 are connected to the bottom track 14 and top track 16 by the use of suitable screws 18. Metal studs are provided with first generally circular openings 20 which are used for running utility services such as electrical wiring or plumbing pipes therethrough. The metal studs 12 are also provided with a second openings 22 which are used to hold suitable bridging members 24. Bridging members 24 are tied to the metal studs 12 by brackets 26 as will be described hereinbelow. Typically second openings 22 are provided at a regular spaced interval along the length of the stud 12. The spacing between the openings 22 is generally on the order of between about 2 and 4 feet. Thus for an eight-foot metal stud 2 such openings are provided on each stud equally spaced to provide a spacing of about two into third feet between each of the openings 22. Similarly a 10 ft. stud would generally be provided with two such openings provide a spacing of three and one-third feet between the openings. Longer studs such as 12 to 16 ft. studs would be provided with three or four such openings to allow the proper spacing for the bridging numbers 24 to provide the support for the metal stud wall.

The shape of the openings 22 can vary depending upon the manufacturer of the metal studs 12. One common shape utilized is a rectangular opening with an arched top 28 such as is illustrated in the figures. Other shapes include rectangular openings with a peaked top and in some cases bottom are also known. Irrespective of the shaping of the opening 22, the common feature is that the opening 22 should allow the bridging member 24 to pass through the opening 22 and be placed in the proper position at the bottom of the opening 22 to provide for the support for the stud wall 10.

Figure 2:
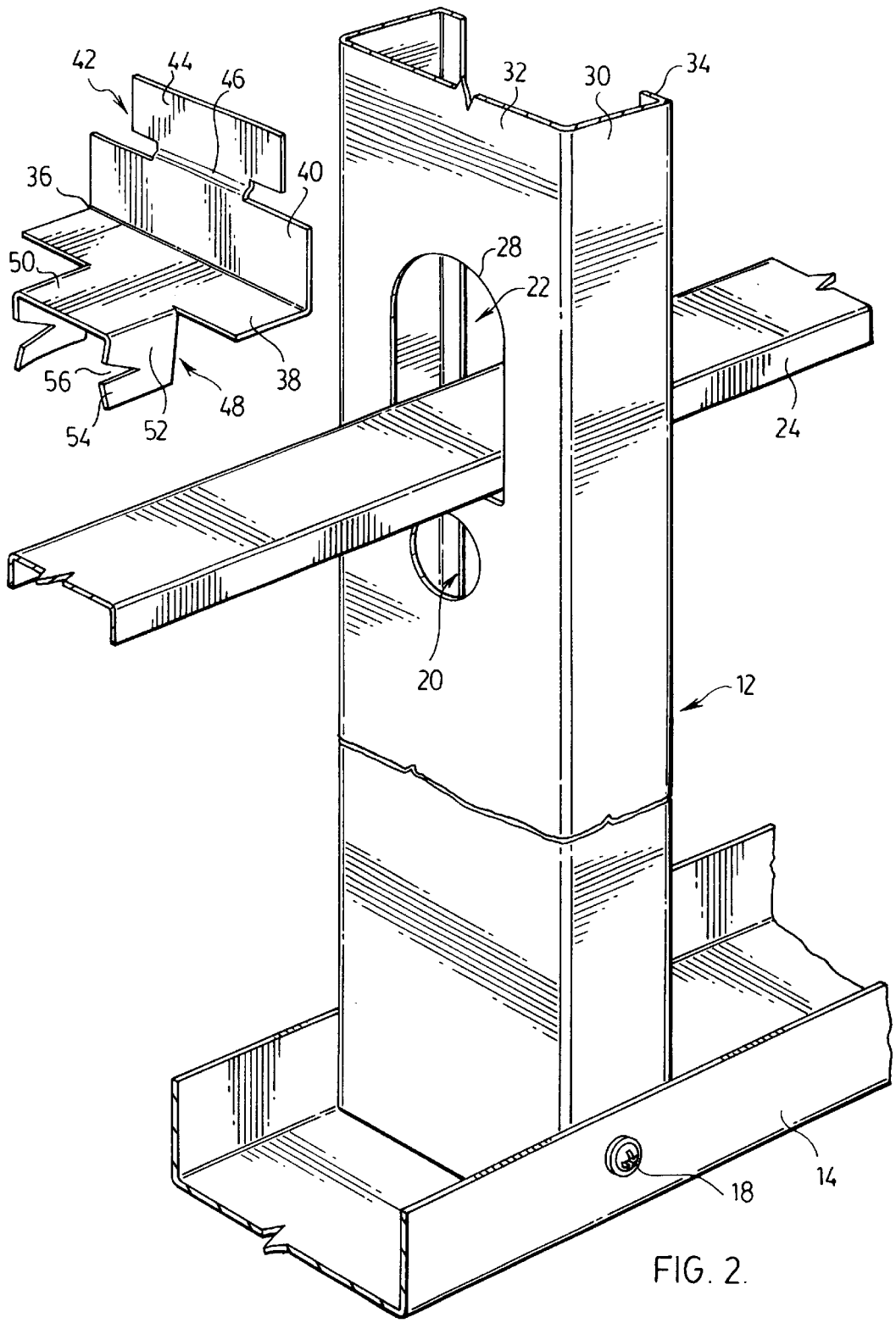
FIG. 2 is a perspective view of a first embodiment of a bracket of the present invention prior to attachment to the stud and bridging member.

FIG. 2 illustrates in closer detail the connection between the metal stud 12 and the bridging member 24. Metal stud 12 is generally C shaped having flanges 30 connected along one edge by a web 32 and having inwardly projecting extensions 34 along the second edge. The opening 22 as described above is generally rectangular with a rounded over top portion 28. Bridging member 24 is generally U-shaped having a width approximately equal to the width of the opening 22. The bridging member 24 is installed in the openings 22 in the studs 12 by inserting the bridging member 24 vertically in the openings 22 and then rotating the bridging member 24 downwardly until it snaps into the proper position in the opening 22. If the bridging member 24 does not lie at the very bottom of the opening 22 it may be pushed downwardly until it rests against the bottom edge of the opening 22.

Once the bridging member 24 is installed within the opening 22 the brackets 26 for tying the bridging member 24 and metal stud 12 together may be installed. The bracket 26 provides for a secure connection between the metal stud 12 and bridging member 24 without the necessity of using mechanical fastenings such as welds or screws. Bracket 26 transfers the support of the bridging member 24 across the web 32 of the stud 12 to provide for good support against rotation and axial bending of the metal stud 12. A first embodiment of the bracket 26 of the present invention is illustrated FIGS. 1 through 6 for use with a metal stud 12 of up to about four inches in depth. Bracket 26 has an L-shaped central region 36 with the leg 38 of the L-shaped central region 36 adapted to rest against the bridging member 24 and the upright 40 of the L-shaped central region 36 adapted to rest against the web 32 of the stud 12. The L-shaped central region 36 transfers the support of the bridging member 24 to the metal stud 12. The length of the L-shaped central region 36 of the bracket 24 should be sufficient to span the majority of the web of the metal stud 12. The bracket 26 is provided with a stud web gripping means 42 to tie the bracket 26 to the metal stud 12. In the first embodiment of the bracket 26 illustrated in FIGS. 1 through 6 this stud web gripping means 42 is provided by a rectangular extension 44 connected to the top edge of the upright 40 of the L-shaped central region 36 by a connector region 46. Rectangular extension 44 is offset rearwardly of the upright 40 of the L-shaped region 36 a distance approximately equal to the thickness of the metal making up the web 32. In order to improve the web gripping properties of the rectangular extension 44 the top edge of the rectangular extension 44 may be inclined slightly back toward the plane of the upright 40 of the L-shaped region 36. This slight canting of the rectangular extension 44 provides a biasing to the stud web gripping means 42 as will be explained further below.

Bracket 26 is also provided with a bridging member gripping means 48 to tie the bracket 26 to the bridging member 24. In the embodiment of the bracket 26 illustrated the bridging member gripping means is provided by a U-shaped extension at the front edge of the leg 38 of the L-shaped central region 36. The U-shaped bridging member gripping means 48 has a base 50 contiguous with the leg 38 of the L-shaped central region 36 and downwardly extending legs 52. The U-shaped bridging member gripping means 48 is dimensioned to overlie the bridging member 24 when the bracket 26 is installed as will be described below. The downwardly extending legs 52 of the U-shaped bridging member gripping means 48 are of a length greater than the height of the bridging member 24. Legs 52 are preferably provided with a inwardly canted lower portion 54 which is formed by a partial cut 56 through the leg 52 and bending the lower portion 54 slightly inwardly. The partial cut 56 in the legs 52 is spaced below the base 50 a distance approximately equal to the height of the bridging member 26. The purpose of the inwardly canted lower portion 54 will be explained further below.

Figure 3:
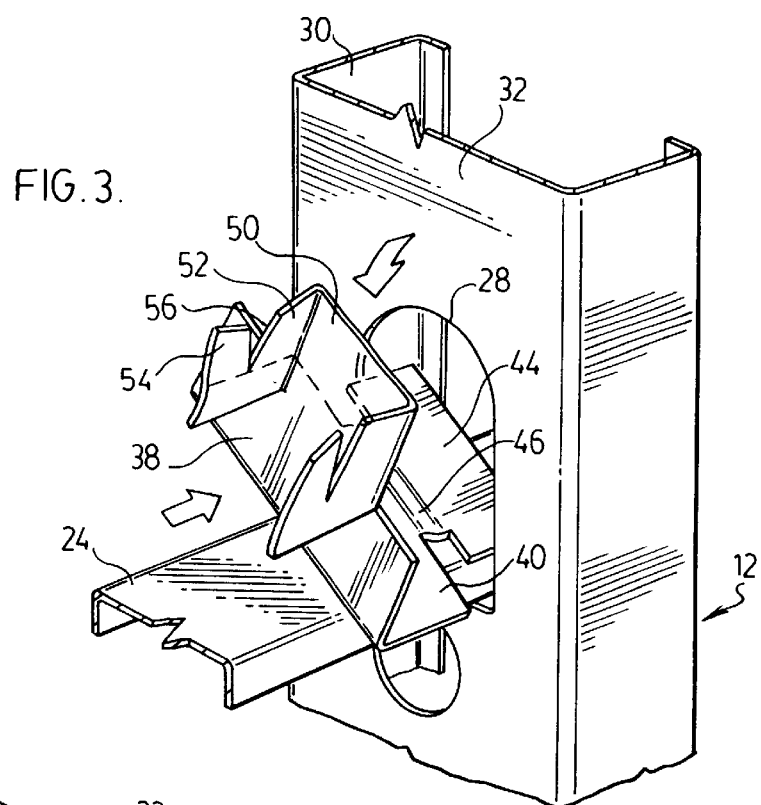
FIG. 3 is a perspective view illustrating the first step in the attachment of the bracket of FIG. 2.
Figure 4:
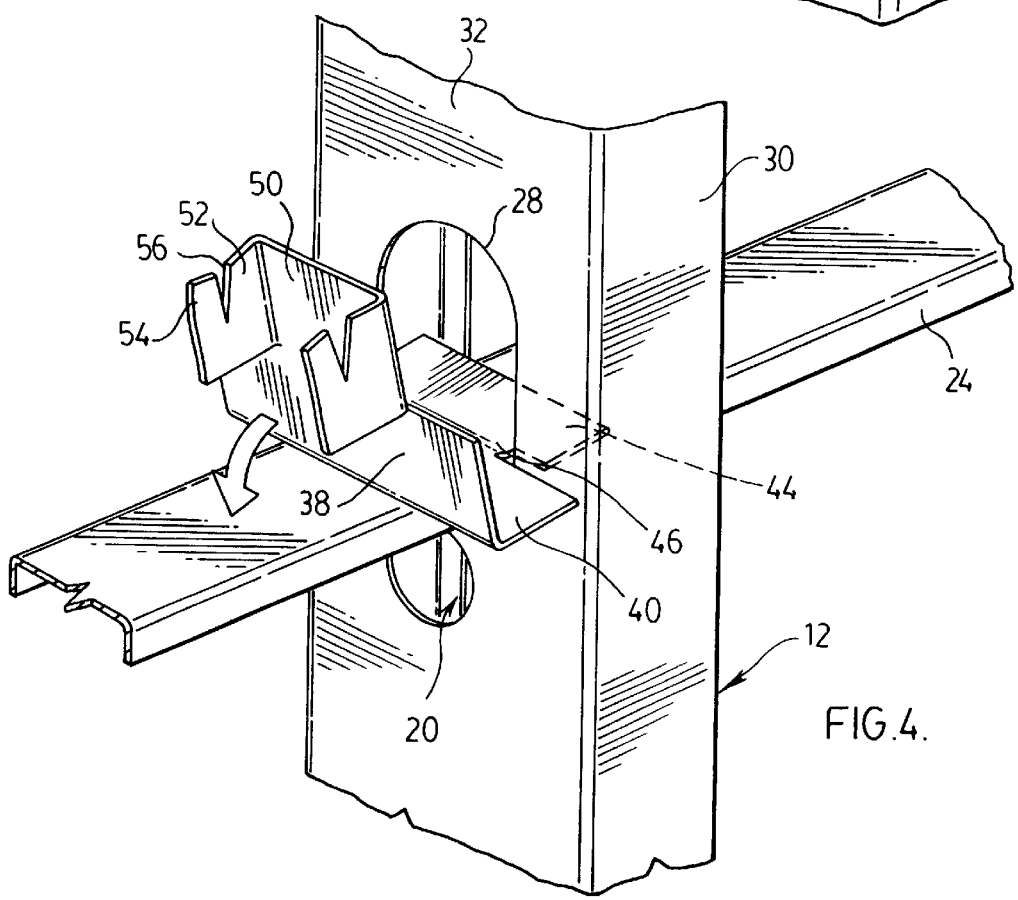
FIG. 4 is a perspective view illustrating the second step in the attachment of the bracket of FIG. 2.
Figure 5:
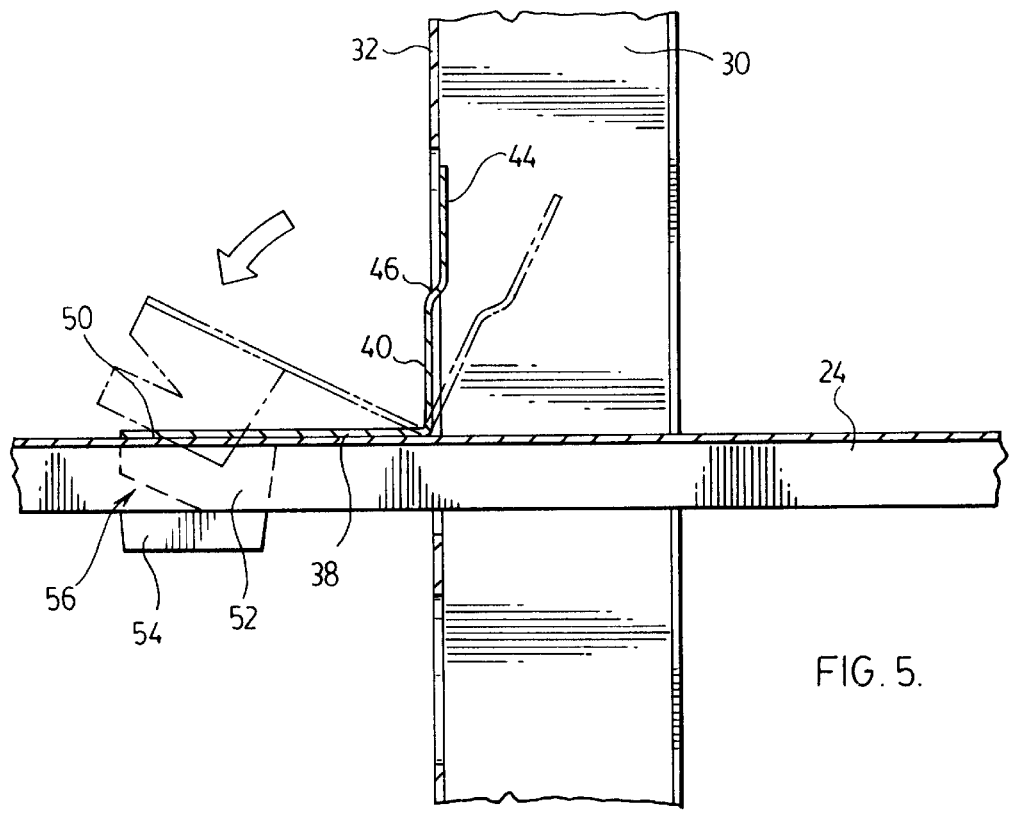
FIG. 5 is a side elevation view illustrating the last step in the attachment of the bracket of FIG. 2.
Figure 6:
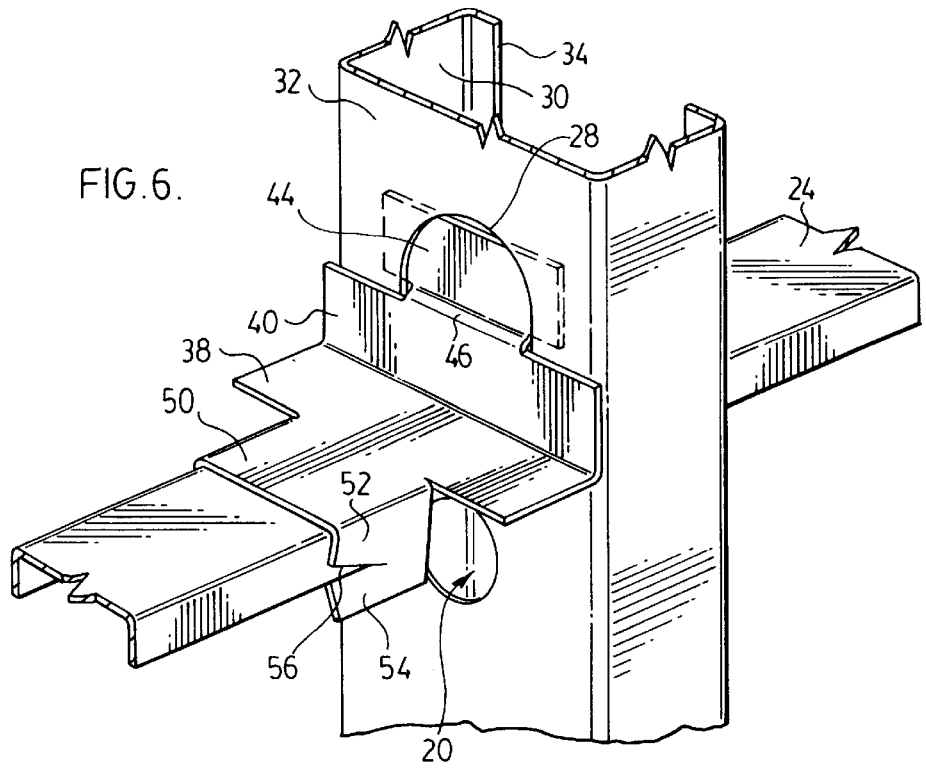
FIG. 6 is a perspective view of the bracket of FIG. 2 attached to the stud and bridging member.

The installation of the bracket 26 will now be explained with reference to FIGS. 3 through 6. As illustrated in FIG. 3, the bracket is tilted rearwardly and at an inclined angle to allow the rectangular extension 44 to pass through the opening 22 in the web 32 of the stud 12. Once the rectangular extension 44 has passed through the opening, the bracket 26 is rotated slightly until the rectangular extension 44 and upright 40 of the L-shaped central region 36 rest against the top surface of the bridging member 24 as shown in FIG. 4. In this position the web 32 of the stud 12 at the outside edges of the opening 22 is contained within notches formed by the lower corners of the rectangular extension 44, the upper corners of the upright 40 of the L-shaped central region 36 and the side edges of the connector region 46. The leg 38 of the L-shaped central region 36 and U-shaped bridging member gripping means 48 are then rotated downwardly as shown in FIG. 5 until the U-shaped bridging member gripping means 48 overlies and grips the bridging member 24. During this downward rotation, the bracket 26 pivots about the notches and the web 32 of the stud 12 contained within the notches. As the U-shaped bridging member gripping means 48 passes over the bridging member 24 during the rotation, the inwardly canted lower portion 54 of the legs 52 are biased outwardly by the legs of the bridging member 24. Once the inwardly canted lower portion 54 of the legs 52 of the U-shaped bridging member gripping means 48 pass the lower edge of the leg of the bridging member 24, they spring back inwardly, gripping the lower edge of the legs of the bridging member 24 as shown in FIG. 6. While the bracket 26 is being rotated, the rectangular extension 44 of the web gripping means 42 presses tightly against the inner surface of the web 32 of the metal stud 12. This causes the web 32 of the metal stud 12 to be sandwiched between the rectangular extension 44 and the upright 40 of the L-shaped central region 36. The combination of the web gripping means 42 and U-shaped bridging member gripping means 48 tightly ties the bridging member 24 to the metal stud 12. The L-shaped central region 36 transfers the support capability of the bridging member 24 across the face of the web 32 of the metal stud 12 and provides for secure support of the metal stud 12 against rotation and axial bending.

Figure 7:
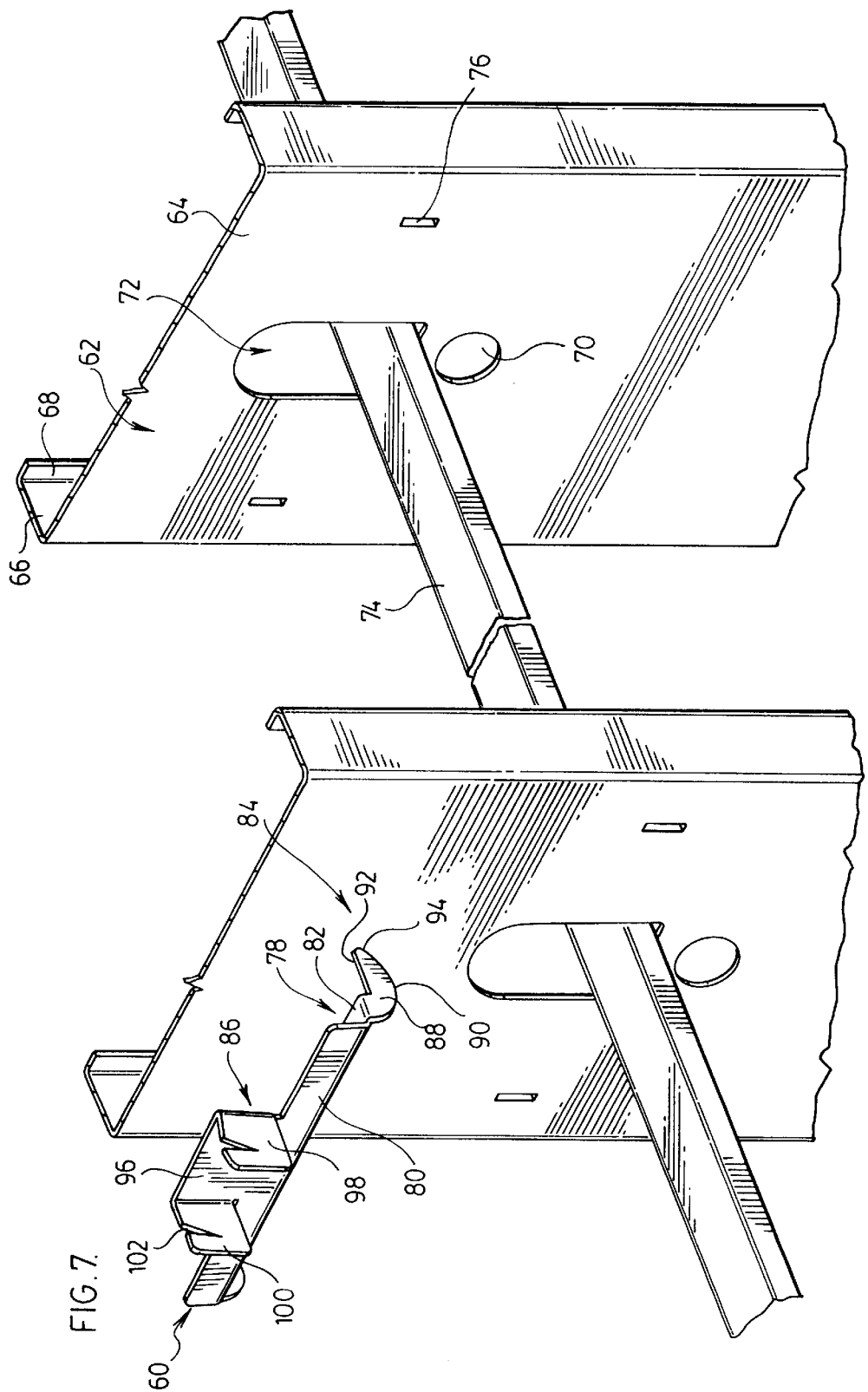
FIG. 7 is a perspective view of a second embodiment of a bracket according to present invention.

A second embodiment of a bracket according to the present invention is illustrated in FIGS. 7 to 9 indicated by the numeral 60. This embodiment of the bracket 60 is of particular use with metal studs 62 over four inches in depth. Similar to the first embodiment, metal studs 62 are generally C shaped with a web 64 connecting flanges 66 along one edge thereof. Flanges 66 are also provided with extensions 68. The web 64 of the metal stud 62 is provided with a first circular opening 70 for utility services such as wiring or plumbing pipes and a second opening 72 with an arched top for holding bridging member 74. The web 64 of the metal stud 62 is also provided with two vertical slits 76 spaced either side of the second opening 72 the purpose of which will be explained further below.

Bracket 60 has an L-shaped central region 78 with the leg 80 of the L-shaped central region 78 adapted to rest against the bridging member 74 and the upright 82 of the L-shaped central region 78 adapted to rest against the web 64 of the stud 62 when the bracket is installed. Bracket 60 is also provided with a web gripping means 84 and a bridging member gripping means 86. Web gripping means 84 are provided by a pair of wings 88 attached to the edge of the upright 82 of the L-shaped central region 78 of the bracket 60. Wings 88 extend perpendicularly and rearwardly of the upright 82 and are provided with a concave rear surface 90. The forward edge 92 of the wings 88 is spaced away from the up right 82 a distance approximately equal to the thickness of the metal of the web 64 of the stud 62. The rear surface 90 and forward edge 92 of the wings 88 meet to form a rounded over top 94. The bridging member gripping means 86 is identical to the first embodiment being a U-shaped extension at the front edge of the leg 80 of the L-shaped central region 78. The U-shaped bridging member gripping means 86 has a base 96 contiguous with the leg 80 of the L-shaped central region 78 and downwardly extending legs 98. The downwardly extending legs 98 are of a length greater than the height of the bridging member 74 and are provided with a inwardly canted lower portion 100 which is formed by a partial cut 102 through the leg 98 and bending the lower portion 100 slightly inwardly. The partial cut 102 in the legs 98 is spaced below the base 96 a distance approximately equal to the height of the bridging member 74.

Bracket 60 is installed to tie the stud 62 and bridging member 74 together by first inserting the rounded over top 94 of the wings 88 of the bridging member gripping means 86 through the vertical slits 76 in the web 64 of the metal stud 62. Once the upper edge of the up right 82 of the L-shaped central region 78 of the bracket 60 contacts the web 64 of the metal stud 62 the bracket 60 is rotated downwardly. The concave rear surface 90 of the wings 88 allow the wings to rotate within the vertical slits 76 of the web 64. The bracket 60 is continued to be rotated until the bridging member gripping means 86 grips the bridging member 74 in the manner described above with the canted lower portion 100 being biased outwardly until it passes below the lower edge of the wall of the bridging member 74. The canted lower portion then springs back to grip the lower edge of the bridging member 74. When the bracket is in its installed position as illustrated in FIGS. 8 and 9 the forward edge 92 of the wings 88 presses against the rear surface of the web 64 of the metal stud 62 and the upright 82 of the L-shaped central region presses up against the front surface of the web sandwiching the web between these two structures. The provision of the web gripping means 84 at either end of the L-shaped central region 78 and close to the edges of the web 64 of the metal stud 62 transfers the support properties of the bridging member 74 across the entire width of the web 64 of the metal stud 62.

The brackets of the present invention provide for simple and rapid installation of bridging support members for metal stud walls. Once a bridging member is installed in the metal stud wall, the bracket is easily installed without the necessity of any mechanical fastening devices such as welding or screws. This provides a significant labor saving over the prior art brackets.

Although various preferred embodiments of the present invention have been described herein in detail, it will be appreciated by those of skill in the art that variations may be made thereto without departing from the spirit of the invention or the scope of the appended claims.

I claim:

1. A bracket for use in a metal stud wall having internal bridging members for tying the metal studs and bridging members together, the bracket comprising L-shaped central region having a leg for overlying the bridging member and an upright for overlying the metal stud, a web gripping means connected to the upright for gripping the web of the stud and transferring the support of the upright to the web, and a bridging member gripping means connected to the leg for gripping the bridging member and transferring the support of the gripping member to the L-shaped central region, the bridging member gripping means being a downwardly opening U-shaped extension at the front edge of the leg of the L-shaped central region, the U-shaped extension having a base being dimensioned to overlie the bridging member when the bracket is installed contiguous with the leg of the L-shaped central region and downwardly extending of a length greater than the height of the bridging member, the downwardly extending legs being provided with a inwardly canted lower portion which is formed by a partial cut through the leg and bending the lower portion slightly inwardly, the partial cut in the legs being spaced below the base a distance approximately equal to the height of the bridging member.

2. A bracket according claim 1, wherein the web gripping means comprises a rectangular extension connected to the top edge of the upright of the L-shaped central region by a connector regions rectangular extension being offset rearwardly of the upright of the L-shaped region a distance approximately equal to the thickness of the web of the stud.

3. A bracket according to claim 2 wherein the rectangular extension is inclined slightly back toward the plane of the upright of the L-shaped region to provide a biasing to the stud web gripping means.

4. A bracket according to claim 1 wherein the web gripping means are provided by a pair of wings attached to the edge of the upright of the L-shaped central region, the wings extending perpendicularly and rearwardly of the upright and provided with a concave rear surface, the forward edge of the wings being spaced away from the upright a distance approximately equal to the thickness of the web of the stud.

5. A bracket according to claim 4 wherein the rear surface and forward edge of the wings meet to form a rounded over top.

6. A metal stud partition wall, the wall comprising a plurality of spaced apart vertical metal studs joined at the top and bottom by U-shaped channel members in which the ends of the studs are connected, the wall also being provided with at least one internal bridging member, the internal bridging member passing through openings provided in the web of the metal studs, the bridging members being structurally tied to the metal studs by brackets comprising an L-shaped central region having a leg overlying the bridging member and an upright overlying the web of the metal stud, a web gripping means connected to the upright gripping the web of the stud and transferring the support of the upright to the web, and a bridging member gripping means connected to the leg gripping the bridging member and transferring the support of the gripping means to the bridging member, the bridging member gripping means being a downwardly opening U-shaped extension at the front edge of the leg of the L-shaped central region having a base overlying the top of the bridging member contiguous with the leg of the L-shaped central region and downwardly extending legs lying against the sides of the bridging member, the downwardly extending legs of the U-shaped bridging member gripping means being of a length greater than the height of the bridging member, the downwardly extending legs having an inwardly canted lower portion which is formed by a partial cut through the leg and bending the lower portion slightly inwardly, the inwardly canted lower portion gripping the bottom edge of the side of the bridging member.

7. A metal stud wall according to claim 6 wherein the web gripping means comprises a rectangular extension resting against the back surface of the web of the stud and a connector region passing through an opening in the web of the stud and connecting the rectangular extension to the top edge of the upright of the L-shaped central region.

8. A metal stud wall according to claim 7 wherein the rectangular extension is inclined slightly back toward the plane of the upright of the L-shaped region to provide a biasing to the stud web gripping means.

9. A bracket according to claim 6 wherein the web gripping means are provided by a pair of wings attached to the edge of the upright of the L-shaped central region, the wings extending perpendicularly and rearwardly of the upright through a vertical slit in the web of the stud, the forward edge of the wings resting against the back surface of the web of the stud above the vertical slit.

10. A metal stud wall according to claim 9 wherein the rear surface and forward edge of the wings meet to form a rounded over top.

* * * * *